United States Patent Office 3,438,166
Patented Apr. 15, 1969

3,438,166
SEALING MEANS AND WINDOW CONSTRUCTIONS INCORPORATING SUCH SEALING MEANS
Bjorn Bakke, Bergen, Norway, assignor to A. Knag A/S, Bergen, Norway
Filed June 26, 1967, Ser. No. 648,621
Claims priority, application Norway, July 1, 1966, 163,740
Int. Cl. E06b 3/64, 3/62
U.S. Cl. 52—400                     8 Claims

ABSTRACT OF THE DISCLOSURE

Window construction in which a sheet glass is bounded by a window frame and sealing means composed of a resilient yielding material having substantially a U shape the legs of which terminate at its upper end in lip portions engaging the window glass and the upper side of the frame portion, respectively, said sealing means being received in a recess in the window frame having sloping walls converging towards the opening of the recess, the legs of the sealing means carrying an abutment means which by the wedge action created by the engagement thereof towards the sloping wall will pull the lip portions downwards.

---

This invention relates to window constructions.

By virtue of the fact that sheet glass, especially thermoglass, has a need for a so called floating mounting and also the need to seal the gap between the glass and the window frame against water penetration, difficulties have arisen in finding a satisfactory solution to the window construction problem, especially where tall buildings are concerned. As a consequence of distortions occurring in the frame and/or glass, inaccurate measurements for the cooperating parts and a variety of weather conditions, previously used sealing means have not been without their shortcomings.

It is an object of the present invention to provide a window construction incorporating a sealing means resulting in a floating mounting in which inaccurate measurements can be compensated for in the cooperating parts.

It is another object of the invention that the accurate positioning of the sheet glass in a protected manner can be guaranteed under different weather conditions whereby pressure and vibrations due to sudden storms and expansions due to changes in temperature can be compensated.

It is still another object of the invention that the penetration of rainwater and other moisture be substantially prevented in the gap between the sheet glass and the window frame.

Accordingly, the present invention provides a window construction which comprises a window frame, sheet glass bounded by said frame and sealing means mounted at the upper and lower edge portions of the sheet glass, each sealing means being received within a recess within said frame and having, at least in the operative position, substantially a U shape in which a corresponding one of the edge portions is enclosed, each of the legs of said sealing means terminating in two lip portions engaging the window glass and the upper side of the frame portion, respectively, the improvement which consists in the combination of the side walls of said recess converging towards the opening of said recess and each leg of said sealing means carrying an abutment means engaging the sheet glass and a corresponding one of said sloping side walls of the recess, whereby, by wedge action, a pull is exerted in a direction substantially parallel to the plane of the glass sheet to pull the lip portions at the end of each leg to a firm tightening engagement against the frame and the glass sheet, respectively.

In order that the invention can be more clearly understood, an embodiment thereof will now be described by way of example, with reference to the accompanying drawing in which.

Figure 1:
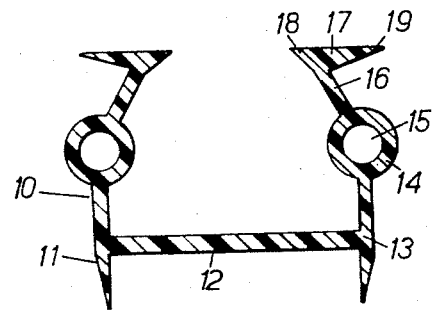
FIG. 1 is a vertical cross-section of the sealing means constructed in accordance with the invention.

Referring to FIG. 1, the sealing means 10 is produced from resilient yielding material, for example, neoprene and is provided with substantially a U shape and tongue-shaped supporting means 11 which will be further described below.

The sealing means 10 includes a web portion 12 and two legs each of which comprises, in order, a straight inner portion 13, which extends at an angle to the web portion 12, a tubular hollow body 14 with the central axis 15 located in alignment with the leg portion 13, a straight outer portion 16 extending radially outwards from a hollow body 14 in a direction obliquely inwards relative to the leg portion 13 and terminated at the outermost end by an outwardly extending sealing flange 17 having oppositely directed lobes, that is to say a short lobe 18 and a broader lobe 19 extending substantially parallel to the web portion 12.

Figure 2:
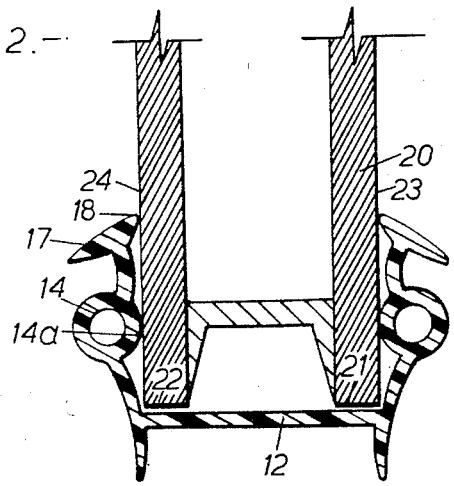
FIG. 2 is another vertical section showing the sealing means of FIG. 1 arranged in position on the sheet glass.

As shown in FIG. 2, the sealing means is drawn into position on the edge portion of a thermoglass 20 with the side edges 21, 22 bearing against the web portion 12 of the sealing means, while the side faces 23, 24 of the glass form an abutment against the inwardly directed arcuate portion 14a of the hollow body 14 and the inwardly directed short lobe 18 of the sealing flange 17.

Figure 3:
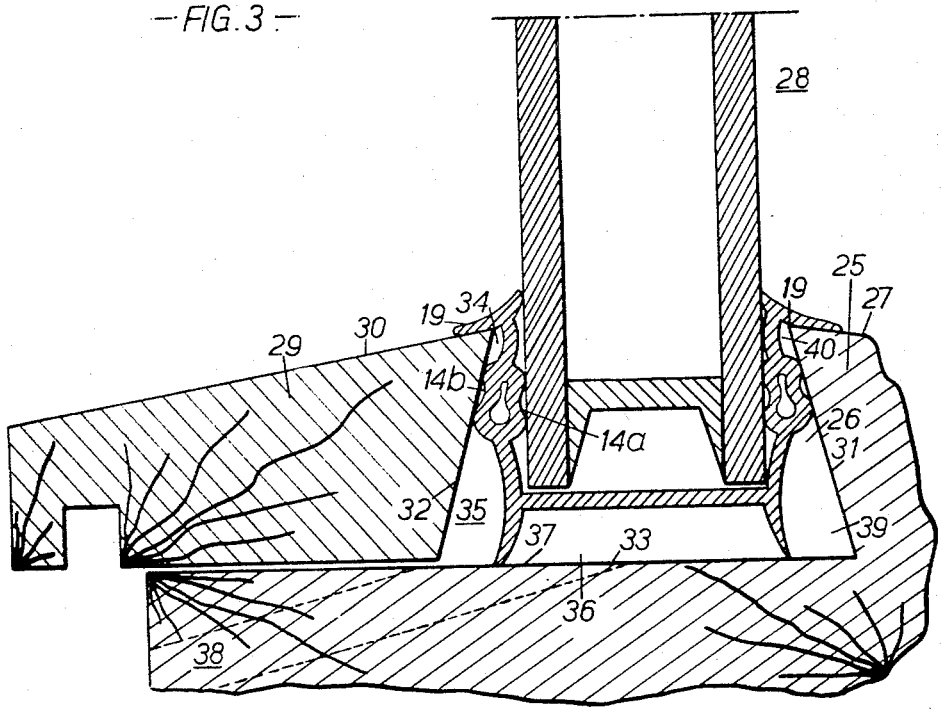
FIG. 3 is a vertical cross-section of a window construction in accordance with the invention, which construction incorporates the sealing means of FIG. 1.

On installing the sheet glass with attached sealing means in the frame of the window construction as shown in FIG. 3, the glass is pushed sideways inwards into an opening 26 in the frame with the outer broader lobe 19 of the lower sealing means resting on the top surface 27 of the frame portion 25 (which is directed inwards toward the room 28 lying within). Thereafter, a frame portion 29 is pushed inwards into the opening 26 to abut against the lower sealing means on the opposite side with the abutment against the arcuate portion 14b of the hollow body 14. After the corresponding broad lobe 19 is arranged in position on the top surface 30 which is directed outwards toward the outside atmosphere, the frame portion 29 is pushed further inwards towards the sheet glass to the position illustrated in FIG. 3 and is secured to the frame in a suitable manner (not shown further). FIG. 3 illustrates the sealing means of the upper and lower edge portions of the sheet glass. In a preferred embodiment of the present invention all four edges of the sheet glass are provided with corresponding sealing means, i.e. sealing means as illustrated in FIG. 2 of the drawings. It will be readily appreciated that the upper sealing means is mounted in position at the same time as the lower sealing means and in a similar manner.

As shown in FIG. 3, the side face 31 at the opening 26 and the corresponding side face 32 of the frame portion 29 converge from the bottom 33 of the opening towards the glass 20, so that a wedge-shaped gap 34 is formed on each side of the glass 20 between the latter and the respective adjacent side face 31 and 32. The gap 34 is dimensioned such that under stress, the sheet glass can creep a certain distance towards and away from these side faces 31 and 32, against the elasticity of the respective resilient yielding hollow body. The hollow bodies 14 are installed in the gap 34 in a partially compressed condition. By means of these resilient partially compressed hollow bodies 14 there is obtained firstly a possibility for centering the sheet glass 20 in position in the window construction and a corresponding possibility for taking up pressure loadings which act against the sheet glass, for example, during sudden storms, and cushioning possible vibrations in the sheet glass, and secondly there is obtained an effective fastening for the sealing means itself between the glass and the window frame. By means of this fastening, the sealing abutment for the sealing flanges 17 against the glass and the window frame is ensured, due to the combined effect which is obtained from the supporting abutment between the window frame and the sealing flanges 17 and the engagement of the two hollow bodies 14 in the wedge-shaped gaps 34.

What I claim is:

1. A window construction comprising a window frame defining a recess, a glass sheet in said recess, and resilient sealing means for supporting the sheet in the recess in sealed relation, said sealing means including a leg which is engaged between said frame and said glass sheet, two terminal lip portions on said leg, one facing said glass sheet and the other resting on said frame, said frame having a surface bounding said recess and facing said glass sheet which is inclined relative to the glass sheet such that the recess increases in size in the direction in which the glass sheet penetrates into the recess, and abutment means in said leg projecting laterally thereof for engaging the glass sheet and said surface of the frame, said leg between the abutment means and the lip portions being free of engagement of the frame and the glass sheet such that a wedge action is produced on the sealing means by relative movement of the glass sheet and frame whereby a pull is exerted in a direction substantially parallel to the plane of the glass sheet to pull the lip portions into tight engagement against the frame and the glass sheet respectively.

2. A window construction according to claim 1, wherein said abutment means is made of a resiliently compressible material and is in at least partly compressed state between the surface of the recess and the glass sheet.

3. A window construction according to claim 1, wherein said abutment means is a tubular portion made of a resilient material and forming part of the leg of said sealing means.

4. A window construction according to claim 3, wherein the diameter of said tubular portion is less than the spacing between the glass sheet and the adjacent surface of the frame at the location of said tubular portion in the engaged position.

5. A window construction according to claim 1 wherein said frame has a second surface bounding said recess on a side of the glass sheet opposite the first said surface, said second surface also being inclined relative to the glass sheet such that the surfaces diverge in the direction in which the glass sheet penetrates into the recess, said sealing means including a second of said legs engaged between said second surface of the frame and the glass sheet.

6. A window construction according to claim 5 wherein said sealing means includes a web, said legs extending upwardly from said web to provide a U-shape for the sealing means.

7. A window construction according to claim 6 wherein said glass sheet has opposite edges and a U-shaped sealing means is mounted at each edge in engagement between the glass sheet and the frame.

8. A window construction according to claim 6 wherein each of the legs of said U-shaped sealing means is extended beyond the web to form tongue shaped supporting means with abut against the frame at the bottom of the recess.

References Cited
UNITED STATES PATENTS

| | | | |
|---|---|---|---|
| 1,045,617 | 11/1912 | Schafer | 52—209 |
| 1,490,240 | 4/1924 | Thomas | 52—400 |
| 1,982,351 | 11/1934 | Phillips | 52—304 |
| 3,040,847 | 6/1962 | Webster | 52—400 |

FOREIGN PATENTS

| | | |
|---|---|---|
| 710,081 | 5/1965 | Canada. |
| 618,645 | 3/1961 | Italy. |

ALFRED C. PERHAM, *Primary Examiner.*

U.S. Cl. X.R.

52—209, 398